Feb. 20, 1934.  F. C. HOBLER  1,948,110
AUTOMOBILE SPRING SHACKLE
Filed Nov. 18, 1932

INVENTOR
Frank C. Hobler.
BY
ATTORNEY

WITNESS
F. J. Hartman.

Patented Feb. 20, 1934

1,948,110

UNITED STATES PATENT OFFICE 1,948,110

AUTOMOBILE SPRING SHACKLE

Frank C. Hobler, Elmira, N. Y.

Application November 18, 1932
Serial No. 643,202

6 Claims. (Cl. 267—54)

The present invention relates to shackles such as are commonly used for connecting the ends of automobile or other vehicle springs with the frame of the vehicle, either directly or through the medium of suitable hangers secured to the frame, to afford the requisite capacity for relative movement between the springs and the frame when the vehicle is traveling over a rough or undulating surface, and is directed to the provision of an improved form of shackle of the screw thread type, and thus embodying internally threaded bushings and externally threaded pins extending therethrough into the side links of the shackle.

The demands of modern automotive production render it essential that the shackles employed for connecting the springs with the chassis of the car be capable of rapid and economical assembly while the car is in the production line, and while numerous forms of threaded shackles have heretofore been suggested, they have been in many instances incapable of satisfactorily fulfilling this requirement because of structural design and/or other reasons, so that while many automotive manufacturers have leaned and still lean toward the use of threaded shackles in their cars, they have largely refrained from employing them because of the difficulty of economically assembling the types of such shackles heretofore available.

The present shackle is designed among other things to overcome this difficulty by providing a shackle of the threaded type which can be assembled in a minimum amount of time and with a minimum amount of labor in the automobile of which it is designed to form a component part, and in which after assembly the threaded pins are positively locked against axial rotation or other movement with respect to the side links.

A further object of the invention is the provision of a shackle of the threaded type which is simple in design and construction, may be manufactured at a relatively low cost, and is adapted for installation in automobiles as at present constructed without requiring any material structural changes or redesigning of existing models so that it may be readily used by automotive manufacturers for new cars or as replacements for shackles already on existing cars.

A still further object of the invention is to provide a shackle of this type embodying in each pin a relatively large lubricant containing chamber into which suitable lubricant can be readily introduced from time to time to insure constant and adequate lubrication of the relatively moving bearing surfaces.

Figure 1:
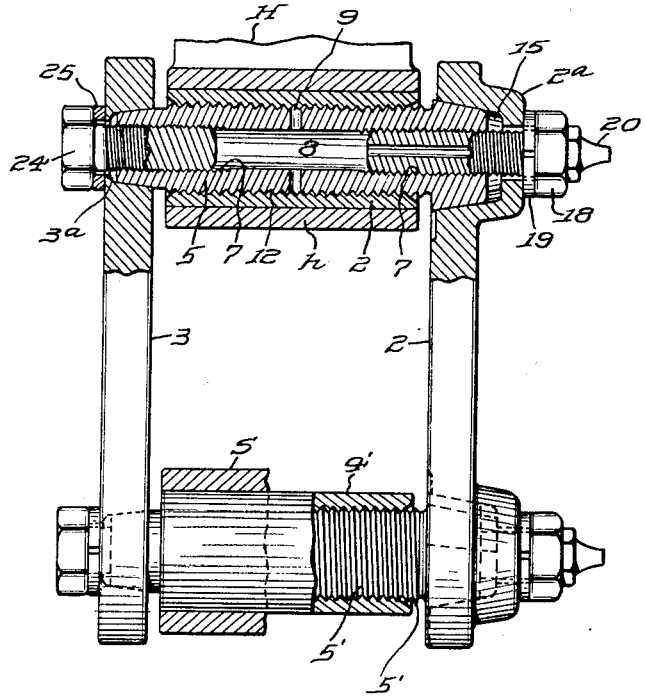
Figure 2:
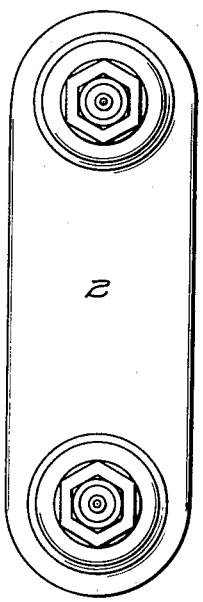
Figure 3:
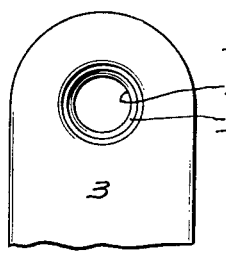
Figure 4:
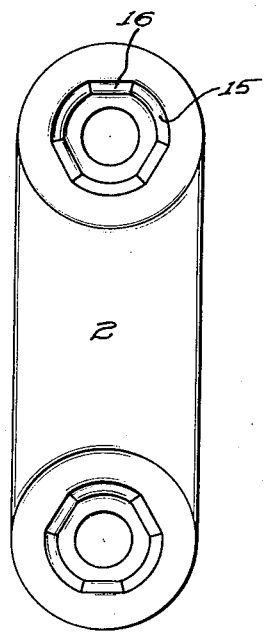
Figure 5:
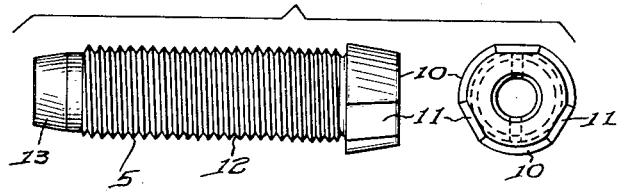

Other objects, advantages, and novel features of design and arrangement comprehended by the invention are hereinafter more particularly pointed out or will be readily apparent to those skilled in the art from the following description of a shackle constructed in accordance therewith, during which reference will be made to the accompanying drawing in which Fig. 1 is a view partially in central section and partially in end elevation of the said shackle, and Fig. 2 is an end elevation thereof. Fig. 3 is a fragmentary inside face view of one of the side links before assembly, and Fig. 4 a similar inside face view of the other side link. Fig. 5 is a composite side and end view showing one of the threaded pins as it appears before insertion in its surrounding bushing. Like characters of reference are used to designate the same parts throughout the drawing.

In Fig. 1 the shackle is shown as forming a connecting medium between two relatively movable members such, for example, as a hanger H attached to the car frame and a spring S, only the eye of which is shown. It will be noted the shackle comprises a pair of side links 2, 3 disposed on opposite sides of the hanger eye $h$ and eye of the spring which lies in substantially the same vertical plane as the hanger eye. In the eye $h$ is non-rotatably seated an internally threaded and externally cylindrical bushing 4 through which extends an externally threaded pin 5 the ends of which are of peculiar conformation and are respectively received in the side links 2, 3 as hereinafter more particularly described. The pin is axially bored from end to end, and relatively fine internal threads 7 are provided in each end of this bore which may be left unthreaded adjacent its center to provide a lubricant chamber 8 from which one or more small radial passages 9 are extended to the threaded outer surface of the pin.

As best shown in Fig. 5, the pin is provided at one end with an enlarged head 10 of generally outwardly tapering frusto-conical form which is machined, ground off or otherwise flattened on its periphery at one or more points to provide flats 11. Desirably, three of these flats are provided and spaced symmetrically about the periphery of the head as shown, but a greater or fewer number can be used if preferred.

At its opposite end beyond its external threads 12 which extend along the body of the pin from adjacent the under face of the head for a distance somewhat greater than the length of the bushing 4 in which the pin is designed to operatively seat, the pin is inwardly tapered at a slight angle to provide a tapered zone or area 13; while the exact degree of the taper of this zone is capable of considerable variation, one of about 7½° to the axis of the pin may satisfactorily be employed.

While reference has heretofore been made more especially to bushing and pin associated with the hanger H, it will of course be understood that a similar bushing 4' is seated in the eye of the spring S adjacent the other end of the shackle and a pin 5' similar to the pin 5 extended therethrough, and that the side links now to be described are respectively of similar conformation adjacent each of their ends so as to properly receive and support the ends of the adjacent pins.

Thus, the side link 2 which is designed to receive the heads 10 of the pins has at each end a pocket 15 arranged to conform thereto, and therefore comprising a conical surface or wall interrupted by symmetrically spaced flats 16 corresponding in number and disposition to those on the pin heads. Each of these pockets, which have their larger open ends adjacent the inner face of the link considering the latter as in assembled position, is desirably formed in the link by a pressing operation which extrudes the metal from the plane of the link blank to form a generally cup-shaped boss 2a extending from the outer face of the link and forming a closure for the outer end of the pocket which is a little deeper than the axial length of the pin head it is designed to receive.

Each boss is centrally drilled for the passage of a retaining bolt 18, the drilled hole being preferably of a little larger diameter than the body of the bolt so that the latter can pass freely therethrough for a suitable distance into the adjacent end of the bore in the pin after the head of the latter has been entered in the side link, the bolt of course being threaded in conformity with the threads 7 in the pins; thus, by setting up on the bolt, the pin head can be drawn very snugly into the pocket and firmly locked therein, a lock washer 19 being preferably disposed between the head of the bolt and face of the boss 2a so as to prevent the bolt from backing off after assembly. Preferably also the bolt is axially drilled to provide a lubricant passage extending to the chamber 8 within the pin and a grease fitting 20 of suitable type mounted on the head of the bolt to communicate with the outer end of this passage so that the lubricant can be readily introduced through the fitting and hole into the said chamber.

The other side link 3 is adapted to receive the conical ends of the pins and is therefore provided adjacent its extremities with correspondingly conical openings 23, the larger ends of which are adjacent the inner face of the link when in assembled position. Each of these openings, which are of a diameter and taper to snugly receive the conical zones 13 of the pins, may be extended entirely through the link or, preferably and as shown, merely to a depth somewhat greater than the length of the zones 13 so as to leave a thin web 3a adjacent the outer face of the link which is in turn drilled for the passage of a retaining bolt 24 generally similar to the bolt 18 save that its body is usually made somewhat shorter so that when the parts are assembled both bolts will terminate in the bore in the pin at approximately the same distance from the inner faces of the side links to which they are respectively adjacent. Additionally, it is of course unnecessary to provide grease passages in the bolts 24 if they are provided in the bolts 18 but, if preferred, the passages and fittings may be associated with these bolts and omitted from the bolts 18, while a lock washer 25 is preferably disposed between the head of each bolt 24 and the outer face of the adjacent link to prevent the bolt from backing off from assembled position. Of course, locking means other than lock washers may be utilized in connection with any or all of the bolts comprised in the shackle if preferred.

It will thus be apparent that the bolts 24 are adapted when set up to draw the conical zones 13 of the pins into the correspondingly conical openings in the link 3 and effect an intimate engagement between the cooperative coned surfaces which eliminates any looseness or rattling at this point.

Brief reference will now be made to the method of assembling the shackle in the automobile of which it is designed to form a component operative element, the several parts of the shackle having been previously constructed substantially as hereinbefore described: The bushings 4, 4' are first respectively seated in the hanger H and spring eye or other parts designed for their reception in such manner they are incapable of axial rotation therein, this being usually effected by pressing the bushings into place. The hanger and end of the spring are then brought into approximate vertical alignment and the pins 5, 5' respectively screwed into the bushings 4, 4' until the externally threaded portions of the pins project for a substantially equal distance from the ends of the bushings. As the threads on the pins and those in the bushings are ordinarily designed to form a snug but not overly tight fit, the operation of screwing the pins into place can be very readily and rapidly performed. The side link 2 is then seated over the heads of both pins, either or both of the latter being turned a little in one direction or the other if required to bring the flats on their heads into proper alignment with the flats in the adjacent head receiving pockets in the link so as to enable the link to be seated over the pin heads. The bolts 18 carrying the lock washers 19 are then inserted, screwed home, and tightly set up so as to force the walls of the pockets in the link into intimate engagement with the corresponding surfaces of the pin heads, thus completing the assembly operation on that side of the shackle. The other link 3 is then seated on the conical zones at the opposite ends of the pins and the bolts 24 screwed home against the lock washers 25 and tightly set up so as to bring the conical surfaces of the holes in the link and the conical zones on the pin ends into intimate engagement, thus completing the assembly operation.

It will be obvious that the seating of the link 3 on the pin ends can be performed irrespective of the positions of rotative adjustment of the pins in the bushings, since whatever be the latter, the pin ends will readily enter the conical holes in the link. Consequently, during the entire assembly operation, the only rotative adjustment of the pins which is ever required after they have been screwed to their approximate operative position in the bushings is that which may be necessary to align their respective flats with those in the pockets in the link 2 and which, when three flats are provided on each pin head, can never amount to more than approximately one-sixth of a full turn and frequently does not even amount to that.

It therefore follows that the assembly operation can be performed very rapidly while, after it is completed, both pins are positively prevented from any axial rotation in the links even if, from lack of lubrication or other causes, the friction between one or both pins and their respective bushings is unduly increased. As a result, the oscillatory movements between the pins and the bushings which are normally induced when the car is in motion, are constrained to take place between these parts and cannot be transferred elsewhere as might occur in the absence of a positive non-rotational connection between the links and the pins were either or both of the latter to "freeze" in their bushings from any cause.

It will further be apparent that the shackle can be readily disassembled for replacement of worn parts or for any other reason, and can be as readily reassembled, while the several elements of the shackle though of such design and construction as to minimize breakage or other failure under normal operating conditions are of a character adapted for manufacture on a production basis.

While I have herein described one form of my invention with considerable particularity, I do not thereby intend to specifically limit myself thereto for minor changes in the design, construction and arrangement of the various parts may be made if desired without departing from the spirit and scope of the invention as defined in the appended claims.

Having thus described my invention, I claim and desire to protect by Letters Patent of the United States:

1. In means adapted to form a connection between relatively movable elements, an internally threaded bushing seated in each element, an externally threaded pin extending entirely through each bushing, each of said pins having at one end a frusto-conical head provided with a flat area on its periphery and, adjacent the other end, a conical zone tapering outwardly toward the axis of the pin, a side link having pockets the walls of which respectively conform to the heads of the pins, another side link having openings the walls of which respectively conform to said conical zones, and means extending through each side link in alignment with the respective pins operative to effect intimate engagement between the peripheries of the pin heads and the walls of the pockets and between the conical zones of the pins and said openings and thereby positively restrain the pins from relative movement with respect to both links.

2. In means adapted to form a connection between two relatively movable elements, an internally threaded bushing seated in each element, an externally threaded hollow pin extending entirely through each bushing provided with internal threads in the extremities of its bore, each pin having at one end a head of frusto-conical form with a series of symmetrically spaced flats on its periphery and at the other end a conical zone tapering outwardly toward the axis of the pin, a side link having pockets receiving and whose walls conform to the peripheral surfaces of the pin heads, bolts respectively extending through said link and engaging the threads in the bores of the adjacent pins operative to effect intimate engagement between the heads of said pins and the walls of the pockets in which they are respectively received, a second side link having conical openings respectively conforming to the conical zones on the other ends of the pins and bolts respectively extending through said link and engaging the threads in the bores of the adjacent pins operative to effect intimate engagement between said zones and the walls of said openings, whereby the pins are maintained in fixed relation with both of said links and with each other.

3. In a spring shackle, the combination of a pair of laterally spaced side links, a pair of internally threaded bushings disposed therebetween, a hollow pin extending through each bushing having external threads on its center portion cooperative with the threads in the bushing, each pin having a head of frusto-conical form with a plurality of symmetrically spaced flats on its periphery and a tapering zone at its end opposite said head, one of the links having pockets conforming in shape to and respectively receiving the heads of the pins, and the other link having openings conforming to and respectively receiving the tapered ends of the pins, and bolts respectively extending through the links into the extremities of the pins operative to draw the links thereonto and maintain intimate engagement of the links therewith whereby both pins are positively held in fixed relation with both links.

4. In a spring shackle, the combination with a pair of laterally spaced side links, a pair of internally threaded bushings disposed therebetween, an externally threaded hollow pin extending through each bushing provided with internal threads adjacent the ends of its bore and at one end with a head of frusto-conical form having a plurality of symmetrically spaced flat areas about its periphery and at the other end with a conical unthreaded zone, one of said side links having pockets adjacent its extremities respectively receiving said heads, the walls of the pockets having curved and flattened areas conformable thereto, and the other link having conical openings conforming to and receiving the conical zones of the pins, and bolts extending through each link and cooperating with the threads in the extremities of the pins operative to draw the extremities of the pins onto the heads of the pins and links respectively onto the conical ends thereof to thereby maintain an intimate engagement between the contacting surfaces of the pins and the links and hold the pins in fixed relation therewith.

5. A spring shackle comprising a pair of internally threaded bushings respectively adapted for reception in the parts to be connected by the shackle, an externally threaded pin extending through each bushing, each pin provided at one end with a head and at the other with an unthreaded zone, a side link having pockets respectively receiving said heads, the walls of the pockets and peripheries of the heads mutually conforming to each other and shaped to negative axial rotation of the pins, means for retaining said link on said heads, another side link having openings respectively adapted to receive the unthreaded ends of both pins in any position of rotative adjustment thereof, and means for removably holding said link onto said ends.

6. A spring shackle comprising a pair of internally threaded bushings respectively adapted for reception in the parts to be connected by the shackle, an externally threaded pin extending through each bushing, each pin provided at one end with a head and at the other with an unthreaded zone, a side link having pockets respectively adapted to receive the heads of both pins when the latter are in predetermined positions of rotative adjustment, the walls of the pockets and peripheries of the heads mutually conforming to each other and shaped to negative axial rotation of the pins when their heads are seated in the pockets, means for retaining said link on said heads, another side link having openings respectively adapted to receive the unthreaded ends of both pins irrespective of their position of rotative adjustment and means for removably holding said link onto said ends.

FRANK C. HOBLER.